(12) United States Patent
Fisher (10) Patent No.: US 8,351,466 B2
(45) Date of Patent: Jan. 8, 2013

(54) OPTIMIZING VIDEO TRANSMISSION OVER MOBILE INFRASTRUCTURE

(75) Inventor: Abraham Fisher, Haifa (IL)

(73) Assignee: Surf Communications Solutions Ltd., Yokneam (IL)

( * ) Notice: Subject to any disclaimer, the term of this patent is extended or adjusted under 35 U.S.C. 154(b) by 305 days.

(21) Appl. No.: 12/735,189

(22) PCT Filed: Dec. 18, 2008

(86) PCT No.: PCT/IL2008/001640
§ 371 (c)(1), (2), (4) Date: Jun. 18, 2010

(87) PCT Pub. No.: WO2009/078025
PCT Pub. Date: Jun. 25, 2009

(65) Prior Publication Data
US 2010/0260122 A1 Oct. 14, 2010

Related U.S. Application Data

(60) Provisional application No. 61/014,947, filed on Dec. 19, 2007.

(51) Int. Cl.
*G01R 31/08* (2006.01)
*H04W 4/00* (2009.01)
*H04J 3/18* (2006.01)

(52) U.S. Cl. .......................... 370/477; 370/235; 370/329

(58) Field of Classification Search .......................... None
See application file for complete search history.

(56) References Cited

U.S. PATENT DOCUMENTS

| | | | |
|---|---|---|---|
| 5,887,252 A | 3/1999 | Noneman | |
| 6,622,019 B1 | 9/2003 | Shalem et al. | |
| 7,698,724 B1 * | 4/2010 | Day | 725/95 |
| 2003/0177255 A1 | 9/2003 | Yun | |
| 2004/0077345 A1 * | 4/2004 | Turner et al. | 455/423 |
| 2004/0258161 A1 | 12/2004 | Castillo et al. | |
| 2004/0266440 A1 | 12/2004 | Fuchs et al. | |
| 2006/0088062 A1 * | 4/2006 | Arsenault et al. | 370/477 |
| 2006/0262851 A1 | 11/2006 | Bakfan et al. | |
| 2006/0268761 A1 | 11/2006 | Bales et al. | |

FOREIGN PATENT DOCUMENTS
WO   WO 2007/131296   11/2007

OTHER PUBLICATIONS
International Application PCT/IL2008/001640 Search Report dated Mar. 30, 2009.

* cited by examiner

*Primary Examiner* — Kwang B Yao
*Assistant Examiner* — Jutai Kao
(74) *Attorney, Agent, or Firm* — D. Kligler L.P. Services Ltd.

(57) ABSTRACT

A method of reducing bandwidth utilization in a cellular network. The method includes receiving packet streams at a suppression unit of a cellular network, identifying a plurality of packet streams carrying the same data content, by the suppression unit; forwarding for packet streams identified as carrying the same data content, fewer packet streams than received, during a period in which the streams are identified to have the same content; regenerating the non-forwarded packet streams of the plurality of packet streams carrying the same data content, by a regeneration unit of the cellular network; and transmitting the plurality of packet streams including the regenerated streams to mobile stations.

11 Claims, 4 Drawing Sheets

FIG.4

OPTIMIZING VIDEO TRANSMISSION OVER MOBILE INFRASTRUCTURE

RELATED APPLICATIONS

The present application is a US National Phase of PCT Application No. PCT/IL2008/001640, filed on Dec. 18, 2008, claiming further priority to U.S. Provisional Application 61/014,947 filed Dec. 19, 2007.

FIELD OF THE INVENTION

The present invention relates generally to content delivery and particularly to reduction of bandwidth utilization in infrastructure networks.

BACKGROUND OF THE INVENTION

Packet based networks comprise a plurality of routers interconnected through communication links. Data transmitted in packet based networks are encapsulated in packets which each contain an address of a destination of the packet. Each router forwards packets it receives toward the respective destinations of the packets. Packet based networks are used to provide many services, including multimedia streaming, data broadcasting and both telephone and fax transmission.

Cellular telephone networks provide communication channels to mobile stations, which are not confined to a specific location. The mobile stations are serviced by base stations which wirelessly transmit signals to the mobile stations located in their vicinity, referred to as a cell. The network connecting the base stations to other communication networks is referred to as a terrestrial network. The cellular telephone networks provide data services using packet based protocols, such as the General Packet Radio Service (GPRS) protocol. According to the GPRS protocol, a mobile station (MS), which requires a data session, registers with a serving GPRS support node (SGSN). Thereafter, the MS generates a context request which initiates a context assignment procedure in which the MS is associated with a packet based address of an external packet based network.

In some cases, mobile stations subscribe to streaming content, such as video content, provided in packets by a streaming server. Where multiple mobile stations within the same cell subscribe for the same stream, the stream is delivered to each of the mobile stations separately, in a manner wasteful in bandwidth.

U.S. Pat. No. 5,887,252 to Noneman, the disclosure of which is entirely incorporated herein by reference, describes using multicast transmission over CDMA cellular networks.

U.S. patent publication 2004/0266440 to Fuchs et al., titled "Multicast Transmission in Packet Based Cellular Networks", the disclosure of which is entirely incorporated herein by reference, describes a cellular network in which requests for streaming channels are intercepted and the streaming content to all the mobile stations in a single cell are provided on a channel of a virtual subscriber, to which all the mobile stations are instructed to listen.

Due to their complexity, multicast procedures have not been widely implemented.

PCT publication 2007/131296 to Williams et al., titled: "Redundant Media Packet Streams", the disclosure of which is entirely incorporated herein by reference, describes use of redundant streams for backup purposes and for switching between the streams when there is a problem with one of the streams.

US patent publication 2006/0262851 to Bafkan et al., titled: "Method and system for Efficient Transmission of Communication Traffic" and U.S. Pat. No. 6,622,019 to Shalem et al., titled: "Increasing Channel Capacity in Fixed Cellular Networks", the disclosures of both of which are entirely incorporated herein by reference, describe methods of reducing bandwidth utilization in cellular networks.

SUMMARY OF THE INVENTION

An aspect of some embodiments of the invention relates to a method of reducing bandwidth utilization in a terrestrial cellular network, in which a suppression unit at the entrance of the network identifies duplicate streams directed to a cell and forwards fewer copies than the number of streams, to the cell. Optionally, only a single copy of the stream is forwarded to the cell. A regeneration unit near the cell reconstructs the duplicate streams and the duplicate streams are forwarded to the mobile stations separately. The regeneration optionally makes the operation of the suppression unit transparent to the mobile stations and hence relatively simple to implement.

An aspect of some embodiments of the invention relates to a method of reducing bandwidth utilization in a cellular network, in which a suppression unit identifies duplicate streams directed to a specific zone, by comparing the frames of the different streams directed to the zone and identifying streams having the same content. The suppression unit drops packets of at least one of the streams determined to have the same content as other streams. In some embodiments of the invention, the suppression unit forwards only a single copy of packets of streams determined to have the same content. Alternatively, up to two or up to three copies, or even more, are transmitted for redundancy robustness in case packets of one of the streams are lost.

An aspect of some embodiments of the invention relates to a method of delivering a video stream in a cellular network. The method includes receiving at a network interface of the cellular network a video stream represented by base frames and non-base frames defined relative to adjacent frames in the video stream and generating additional base frames for the video stream, within the cellular network.

Optionally, only some of the generated additional base frames are delivered to mobile stations serviced by the network. In some embodiments of the invention, the generated additional base frames are distributed to a plurality of units within the cellular network in parallel to original non-base frames representing the same frames and the plurality of units each select whether to use the generated base frames or the original non-base frames.

An aspect of some embodiments of the invention relates to a method of delivering a video stream in a cellular network. The method includes providing a unit of a cellular network with both a base frame and a non-base frame representation of a video frame and allowing the cellular network unit to select which of the frames to use.

In some embodiments of the invention, the base frames generated within the cellular network are used to respond to retransmission requests from cellular base stations that did not receive one or more packets and need a base frame to resynchronize. The additional base frames allow responding to these requests within a shorter response time than available if only originally provided base frames are used.

In other embodiments of the invention, the base frames generated within the cellular network are used when a mobile station moves between cells and/or when suppression of a stream is initiated or terminated.

Optionally, when a mobile station moves from one cell to another, a cellular network unit drops all the frames of a video stream directed to the mobile station until a base frame of the stream is reached, under the assumption that the mobile station lost at least one frame in the movement between cells and will not be able to properly use non-base frames.

There is therefore provided in accordance with an exemplary embodiment of the invention, a method of reducing bandwidth utilization in a cellular network, comprising receiving packet streams at a suppression unit of a cellular network; identifying a plurality of packet streams carrying the same data content, by the suppression unit; forwarding for packet streams identified as carrying the same data content, fewer packet streams than received, during a period in which the streams are identified to have the same content; regenerating the non-forwarded packet streams of the plurality of packet streams carrying the same data content, by a regeneration unit of the cellular network; and transmitting the plurality of packet streams including the regenerated streams to mobile stations.

Optionally, identifying the plurality of packet streams carrying the same data content comprises identifying based on a channel indication within the packets of the streams. Optionally, identifying the plurality of packet streams carrying the same data content comprises identifying based on indications received from a unit external to the suppression unit. Optionally, forwarding for packet streams identified as carrying the same data content, fewer packet streams than received comprises forwarding only a single packet stream.

Optionally, forwarding for packet streams identified to carry the same data content, fewer packet streams than received comprises forwarding at least two packet streams having a same content. Optionally, identifying the plurality of packet streams carrying the same data content comprises identifying based on a comparison of frame sizes of frames of the streams.

Optionally, identifying a plurality of packet streams carrying the same data content, by the suppression unit comprises comparing the received streams to time shifted versions of each other. Optionally, comparing the received streams to time shifted versions of each other comprises comparing with different extents of time shifting, up to a predetermined maximal time shift. Optionally, the predetermined maximal time shift is greater than 80 milliseconds.

Optionally, identifying the plurality of packet streams carrying the same data content comprises identifying streams determined to have same attributes within a predetermined window. Optionally, the predetermined window has a size of at least 2.5 seconds. Optionally, forwarding for packet streams identified to carry the same data content, fewer packet streams than received comprises stopping to forward packets of a stream whose packets were previously forwarded, responsive to the identification. Optionally, the stream comprises a video stream and wherein stopping the forwarding of packets of the stream is performed directly before a base frame of the video stream.

There is further provided in accordance with an exemplary embodiment of the invention, a method of reducing bandwidth utilization in a cellular network, comprising receiving frame streams at a suppression unit of a cellular network; comparing at least an attribute of the frames of the received packet streams to each other, so as to determine groups of streams having the same frames over at least a predetermined window size; and forwarding the received packet streams, but for packet streams determined to have the same frames forwarding fewer packet streams than received, during a period in which the streams are identified to have the same content.

Optionally, comparing the at least an attribute of the frames of the received packet streams to each other comprises comparing the lengths of the frames. Optionally, receiving frame streams comprises receiving video streams. Optionally, comparing the at least an attribute of the frames of the received packet streams comprises comparing at least 5% of the actual bits of the compared streams. Optionally, comparing the at least an attribute of the frames of the received packet streams comprises comparing at least 25% of the actual bits of the compared streams.

There is further provided in accordance with an exemplary embodiment of the invention, a method of delivering a video stream in a cellular network, comprising receiving, at an interface to a cellular network, a video stream including both base frames whose representation does not depend on other frames and non-base frames whose representations depend on at least one other frame; and generating base frames for at least some of the non-base frames of the streams, within the cellular network.

Optionally, the method includes forwarding the stream with the generated base frames replacing their respective non-base frames, within the cellular network.

Optionally, the method includes forwarding the stream with the generated base frames along side their respective non-base frames, within the cellular network to a selection unit.

Optionally, the method includes selecting by the selection unit the non-base frame or the respective base frame and forwarding the stream with the selected frame to a mobile station. Optionally, the selecting by the selection unit is performed responsive to a suppression state of the delivery of the stream within the cellular network. Optionally, at least 20% of the generated base frames are not delivered to any mobile stations by the network. Optionally, generating the base frames comprises generating an amount of base frames which dynamically depends on the available bandwidth for forwarding the streams.

There is further provided in accordance with an exemplary embodiment of the invention, a method of delivering a video stream in a cellular network, comprising receiving, at a unit of a cellular network, a video stream including both base frame representations which do not depend on other frames and non-base frame representations that depend on at least one other frame, with a plurality of frames represented by both base frame representations and non-base frame representations; selecting by the unit of the cellular network for each frame represented by a plurality of frame representations a single representation; and forwarding the stream with the selected frame representations to a mobile station.

Optionally, at least 1% and/or less than 2% of the frames are represented by a plurality of frame representations.

There is further provided in accordance with an exemplary embodiment of the invention, a suppression unit of a cellular network, comprising an input interface adapted to receive packet streams; an output interface adapted to forward packet streams toward mobile stations; an identification unit configured to identify packet streams carrying the same content by comparing at least an attribute of the frames of the received packet streams to each other; and a switching unit adapted to determine which streams received through the input interface are to be forwarded through the output interface identification unit, responsive to instructions from the identification unit.

Optionally, the identification unit is configured to identify packet streams carrying the same content responsive to the lengths of frames of the streams.

There is further provided in accordance with an exemplary embodiment of the invention, a regenerator of a cellular network, comprising an input interface adapted to receive packet streams; an output interface adapted to forward packet streams toward mobile stations; and a regeneration unit adapted to regenerate packet streams having the same content as streams received through the input interface and to forward the regenerated streams through the output interface. Optionally, the regeneration unit is adapted to begin the regeneration of streams from a base frame of the regenerated stream.

BRIEF DESCRIPTION OF FIGURES

Particular, non-limiting, embodiments of the invention will be described with reference to the following description of embodiments in conjunction with the figures. Identical structures, elements or parts which appear in more than one figure are preferably labeled with a same or similar number in all the figures in which they appear.

DETAILED DESCRIPTION OF EMBODIMENTS

Figure 1:
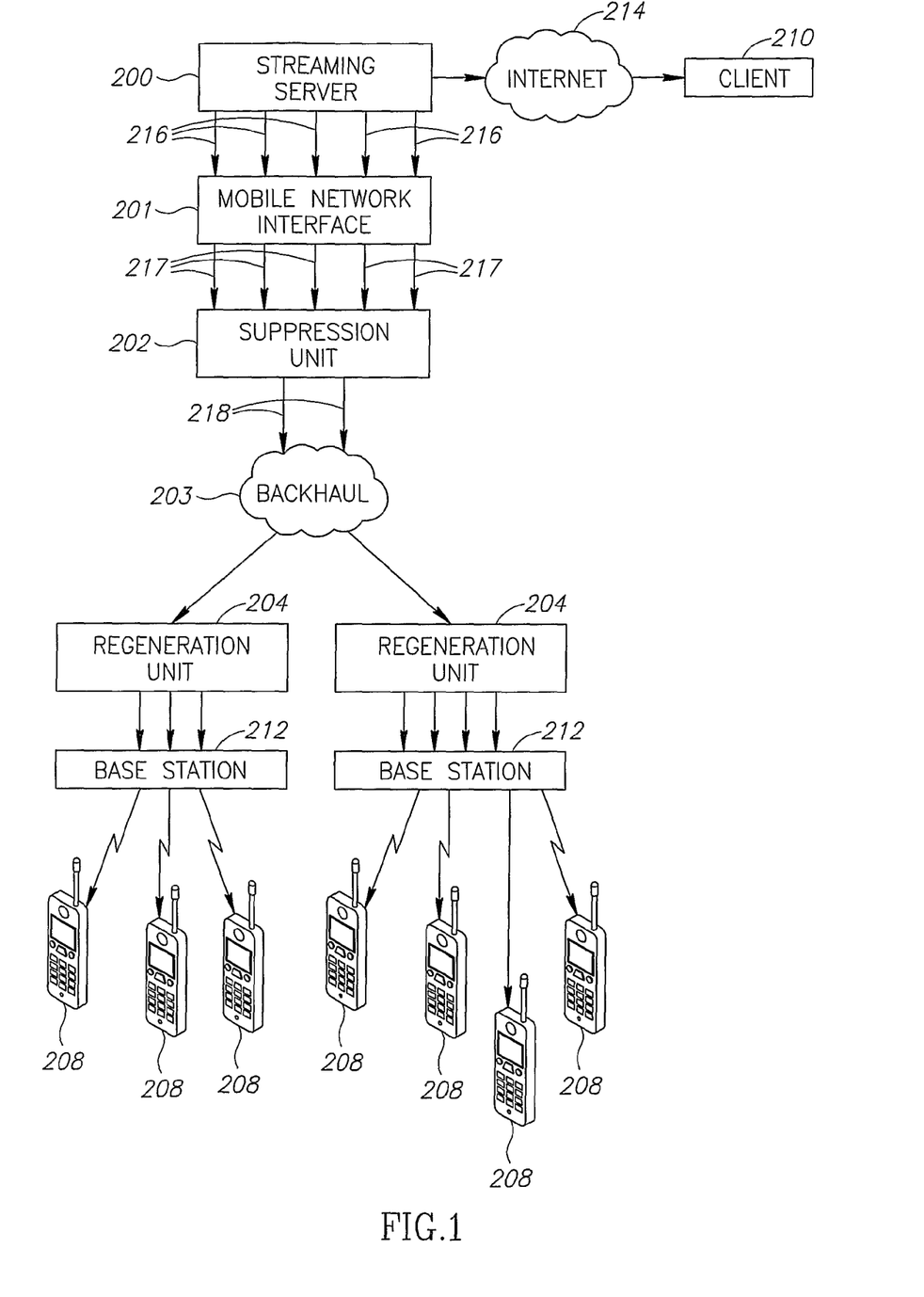
FIG. 1 is a schematic illustration of a network path for delivery of streaming channels to mobile stations, in accordance with an embodiment of the present invention.

FIG. 1 is a schematic illustration of a network path for delivery of streaming channels to mobile stations 208, in accordance with an embodiment of the present invention. A streaming server 200 generates a stream of packets for delivery to subscribers, such as mobile stations 208 and optionally client computers 210, for example through the Internet 214 or other suitable network. Streaming server 200 optionally provides a separate stream of packets 216 to each subscriber in accordance with a unicast transmission method, or at least to each mobile station 208, which is a subscriber. The packet streams 216 directed to mobile subscribers 208 are forwarded to a mobile network packet interface 201 (e.g., a GGSN), for delivery to respective base stations 212, such as base transmission stations (BTS) or Node Bs of Universal Mobile Telecommunication System (UMTS), for delivery to the mobile subscribers. Alternatively, streaming server 200 provides a single packet stream 216 and the stream is divided into separate streams delivered to the subscribers in accordance with multicast methods known in the art. In some embodiments of the invention, in accordance with this alternative, mobile network interface 201 receives a single stream and divides it into a plurality of streams 217, with a separate stream being provided for each of the mobile subscribers 208 serviced by the network.

In accordance with some embodiments of the invention, a suppression unit 202 detects same-content packet streams 217 directed to a single base station 212 and forwards only a single copy 218 of the stream to each base station 212, so as to reduce the load on the backhaul 203 of the mobile network. Respective regeneration units 204 near base stations 212 reconstruct the other copies of the streams and the base stations 212 transmit the packet streams to the mobile station subscribers 208, without the subscribers being aware of the suppression and regeneration. In some embodiments of the invention, the base stations 212 are also not aware of the suppression.

Streaming server 200 may provide live or prestored video content, or other content, such as audio (voice, music or other), image sequences or text. The streams may be provided in accordance with any protocol known in the art, such as UDP and IP, possibly with the RTP (Real Time Protocol) protocol. In some embodiments of the invention, the streaming is governed by the Real Time Streamlining Protocol (RTSP), although other protocols or proprietary methods may also be used, such as the Internet Protocol Television (IPTV) protocol. Optionally, each stream channel having a unique content is identified in its packets by a unique identification number, for example an identification number of the Session Description Protocol (SDP).

It is noted that streaming server 200 may be connected directly to mobile network packet interface 201 or there may be one or more processing units and/or routers, possibly even an Internet segment, between streaming server 200 and interface 201.

Operation of Suppression Unit

In some embodiments of the invention, suppression unit 202 identifies identical-content streams by examining a descriptor of the streams, e.g., the SDP descriptor. Streams having the same descriptor directed to the same bases station 212 are considered to have the same content and accordingly one of the streams is considered a master stream and forwarded toward the base station, while the other streams are suppressed and not forwarded.

Alternatively or additionally, the determination of whether two streams include the same content is performed based on a comparison of actual segments of the streams or based on a comparison of attributes of the streams. This alternative allows performing the determination even when the exact structure of the packets is not known, for example when the location of the descriptor within the packets of the stream is not known. In addition, this alternative may be used even when the streams are encrypted and suppression unit 202 does not have the decryption key or it is otherwise preferred that suppression unit 202 not decrypt the streams. The compared attributes optionally include the lengths of the frames of the stream and/or the contents of the real time protocol (RTP) headers of the packets.

Alternatively to suppression unit 202 determining which streams have the same data, suppression unit 202 may be configured to receive indications of streams carrying same data from an external unit, for example from streaming server 200 and/or from an external comparison unit.

Figure 2:
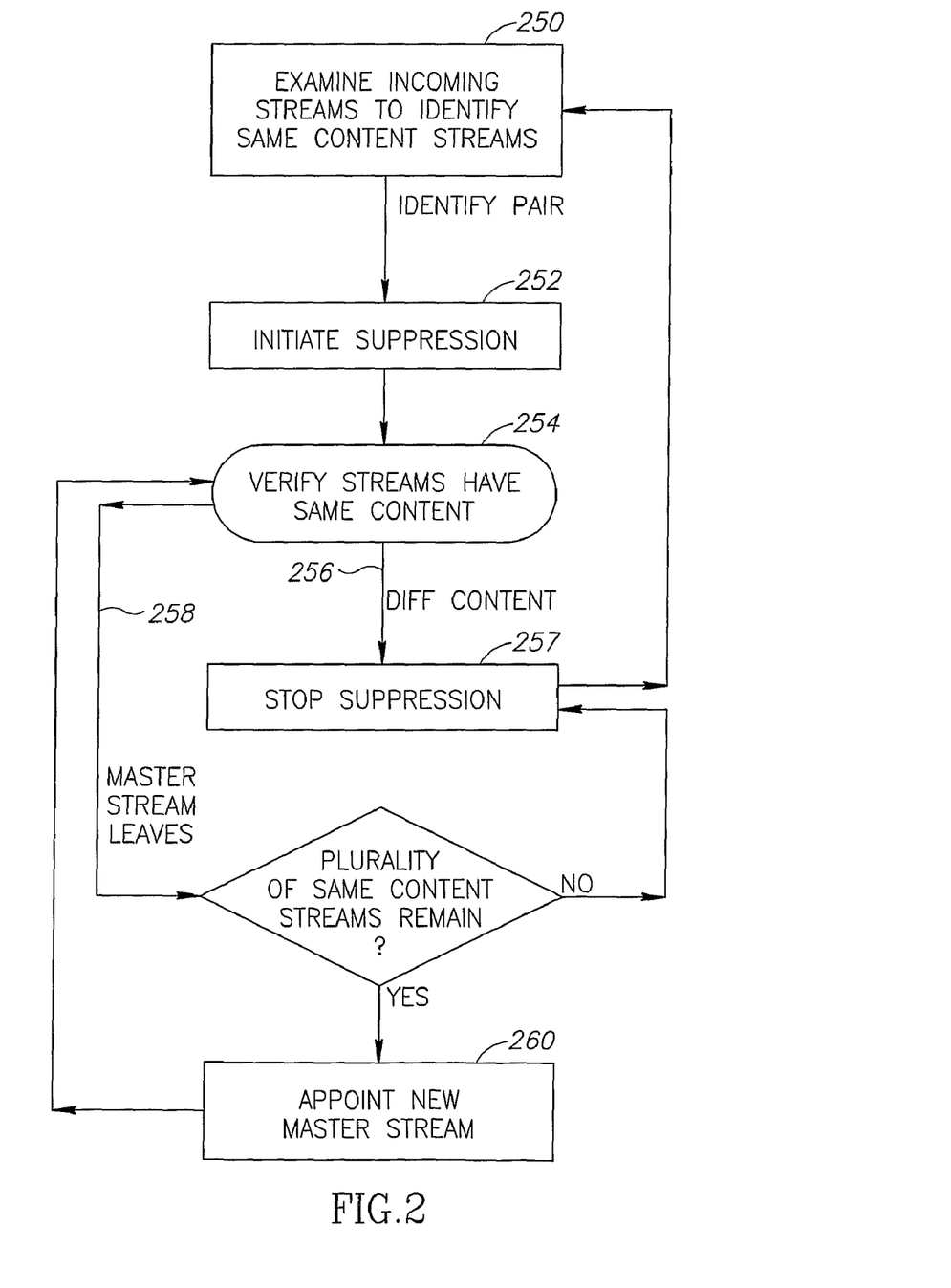
FIG. 2 is a flowchart of acts of a suppression unit, in accordance with an exemplary embodiment of the invention.

FIG. 2 is a flowchart of acts performed by suppression unit 202 on streams directed to a specific base station 212 or group of base stations, in accordance with an exemplary embodiment of the invention. Suppression unit 202 optionally continuously examines (250) the incoming streams not already identified as having the same content as one or more other streams, to determine whether they have the same content as one or more other streams. The continuous examination optionally finds pairs of streams that have the same content over at least a predetermined time period. For each pair of streams determined to have the same content, suppression of one of the streams is initiated (252). In some embodiments of the invention, suppression unit 202 continues to verify (254) that streams previously determined to carry the same content are still carrying the same content. If the suppressed stream is determined (256) at some point to have a different content than the master stream, the suppression is stopped (257) and the streams are both forwarded to their destination without suppression. Streams not having same content with other streams are returned to a pool of streams continuously examined (250) for pairs of streams.

If (258) a master stream leaves a cell and moves to a different cell, a different master stream is appointed (260) if a plurality of streams having the same content still remain in the cell. If, however, there is only one other stream with the same content, the suppression of the other stream having the same content is stopped (257). Suppression unit 202 optionally continues to forward the packets of the stream moving out of the cell also to the old cell, if such packets are received, until a smooth change is achieved.

Identifying Streams with Same Content

Referring in more detail to examining (250) the incoming streams, in some embodiments of the invention, the initial comparison is performed for a window of the stream having a duration of at least 1 second, for example 3 seconds. Other suitable window sizes may be used instead.

The comparison of two streams to determine whether they are identical is optionally performed for a plurality of relative timings of the streams, so that same-content streams are found even when one of the streams is delayed relative to the other. The maximal time difference for which the comparison is performed is optionally selected as a compromise between finding as many identical streams as possible for suppression of the redundancies and minimizing processing power spent on the comparison. Optionally, the maximal time difference is smaller than 0.5 seconds, smaller than 300 milliseconds and may even be smaller than 150 milliseconds. In an exemplary embodiment of the invention, the maximal time difference for which the search is performed is 100 milliseconds. The comparison is optionally performed for a time difference of at least 50 milliseconds or even more than 80 milliseconds.

In some embodiments of the invention, the search for streams carrying the same data is performed in a plurality of stages. In a first stage, suppression unit 202 searches for pairs of streams directed to the same base station 212, or same group of base stations serviced by the same regeneration unit 204, which have one or more common attributes which may indicate that the streams carry the same data stream. Thereafter, the pairs are examined to determine whether the pairs actually carry the same data. For example, in the first stage, the search may be based on the lengths of several consecutive packets or frames, between the streams. In the second stage, the lengths of all the packets and/or frames of the candidate streams are compared and/or the actual data of the streams is compared.

Figure 3:
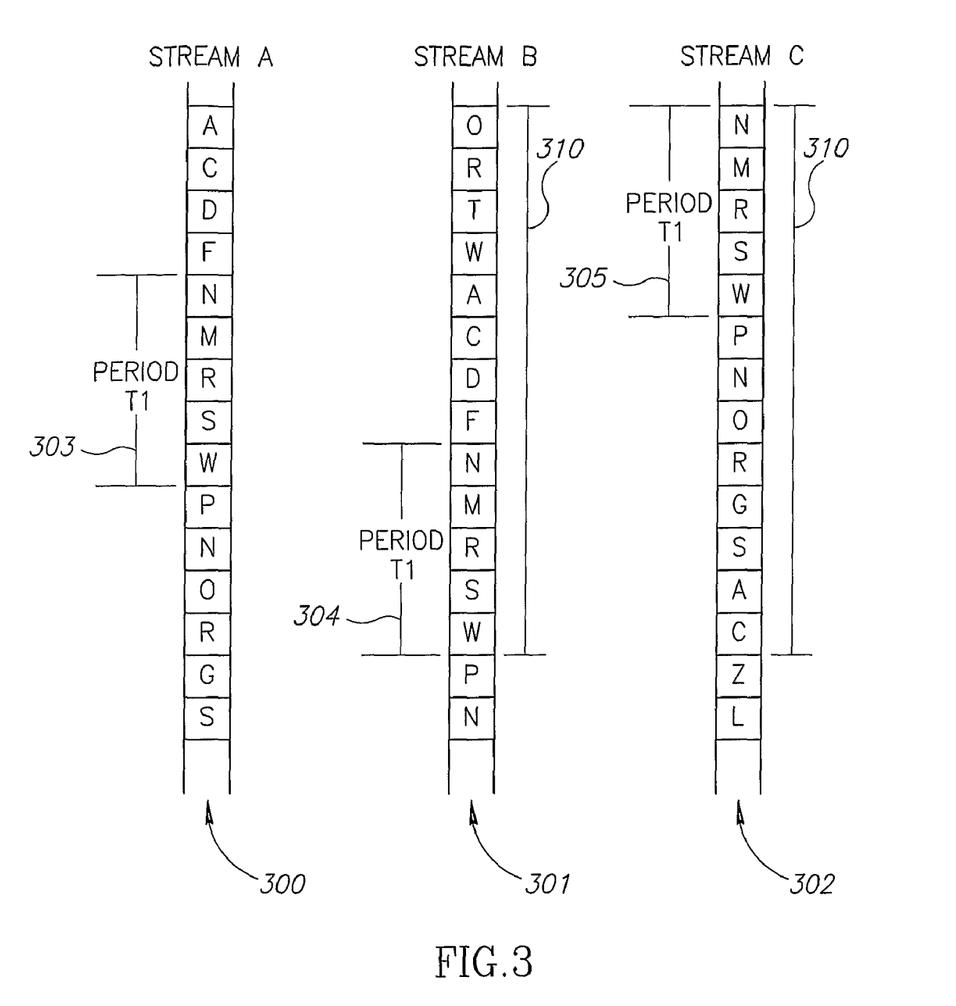
FIG. 3 is a schematic illustration of streams being compared, in accordance with an exemplary embodiment of the invention.

FIG. 3 is a schematic illustration of streams being compared, in accordance with an exemplary embodiment of the invention. Each video stream handled by suppression unit 202 is optionally represented by a sequence of values representing the frames of the stream. In FIG. 2, three streams A, B and C are represented by sequences 300, 301 and 302, respectively. A first stream is selected and a predetermined compared window 303 of its sequence 300, having a length T1, is searched for in sequences 301 and 302. The compared window 303 is searched within a larger window 310 of sequences 301 and 302, allowing for a time difference relative to sequence 300. The base sequence (in the above example, sequence 300) of the comparison is optionally selected, either arbitrarily or based on the timing information in the headers of the sequences, for example selecting the earliest sequence.

Large window 310 optionally extends before and beyond compared window 303 by a same extent. Alternatively, when the selected stream A is known to be earlier or later than other streams, Larger window 310 may extend beyond compared window 303 only in a single direction, or to a greater extent in one direction than the other. If a window having a same content as compared window 303, is found, as illustrated by windows 304 and 305 in sequences 301 and 302, respectively, the streams are considered as carrying the same data stream or are passed to a second stage for more careful examination of whether they carry the same data stream.

In some embodiments of the invention, the values representing the frames are the number of bytes representing each frame in the stream.

Certainty Level

The initial comparison and verification are optionally performed at a high level of accuracy, for example comparing the entire actual content, to make sure that streams considered as carrying the same data actually carry the same data. Alternatively, in order to limit the processing resources required, the comparison and verification are performed based on statistical assumptions which make it very unlikely that streams considered carrying the same data are different. For example, the lengths of the frames may be compared rather than the bits of the frames themselves and/or the comparison and/or verification may be performed on a percentage of the streams and not on the entire stream. For example, in some embodiments of the invention the verification checks the length of each frame, whereas the bit content of less than every five or ten frames is compared. In an exemplary embodiment of the invention, in the comparison, if the lengths match, a percentage of the bit content, for example at least 20% or even at least 40% are compared. Optionally, in accordance with this example, less than 60% of the bits are compared, thereby reducing the processing resources required for the comparison.

Suppression

Referring in detail to the suppression (252), in some embodiments of the invention, when a plurality of streams to the same base station 212 are identified, one of the streams is selected to serve as a master stream, while the remaining streams are suppressed. The suppression optionally includes dropping the packets of the suppressed stream and instead of transmitting the dropped packets, transmitting a notification identifying the suppressed stream and the master stream from which the data is to be retrieved. The streams are optionally identified according to their UDP/IP identifications (e.g., IP addresses and/or UDP ports).

The stream chosen to serve as the master stream is optionally selected according to the timing information of the streams. Optionally, the stream arriving earliest is selected as the master stream. Alternatively or additionally, the master stream is selected as the stream directed to a mobile station having a lowest predicted chance to leave the cell. In some embodiments of the invention, the streams are rated according to their chances of moving out of the cell or otherwise stopping to receive the stream and the master stream is selected accordingly. For example, the rating of the streams may be based on previous mobile station behavior. In some embodiments, the ratings of the streams are based on the locations of their mobile stations within the cells, higher ratings being assigned to streams of mobile stations located in the center of the cell.

Suppression Notification

The notification is optionally transmitted in a plurality of copies, to ensure that the intended regeneration unit 204 receives the notification. Optionally, the notification of the suppressed stream is transmitted before the suppression begins, to ensure that intended regeneration unit 204 receives the notification before required packets of the master stream are forwarded by regeneration unit 204. Alternatively or additionally, regeneration unit 204 buffers copies of the streams it receives for a sufficient time, such that if a notification on a suppressed stream is received late, copies of the frames of the master stream are still available for regeneration of the suppressed stream. In some embodiments of the invention, suppression unit 202 marks master streams, and regeneration unit 204 only buffers marked master streams. In some embodiments of the invention, the notifications of suppressed streams are appended to their respective master stream, such that the notifications are received with the master stream and if they are lost or delayed, they are lost or delayed with the master stream.

Optionally, notifications are transmitted for each packet of the master stream. Alternatively, notifications are transmitted periodically, for example every 10 or 20 packets. Further alternatively, notifications are transmitted less frequently, for example less than every 25 or even less than every 50 packets. In some embodiments of the invention, notifications are transmitted only when the suppression begins. When the suppression ends, regeneration unit 204 identifies the end of the suppression by receiving packets of the stream. Alternatively, notification is transmitted also when the suppression is discontinued.

In some embodiments of the invention, the suppression is not started until an acknowledgement of the suppression notification is received by suppression unit 202 from the to regeneration unit 204 receiving the suppressed stream.

Figure 4:
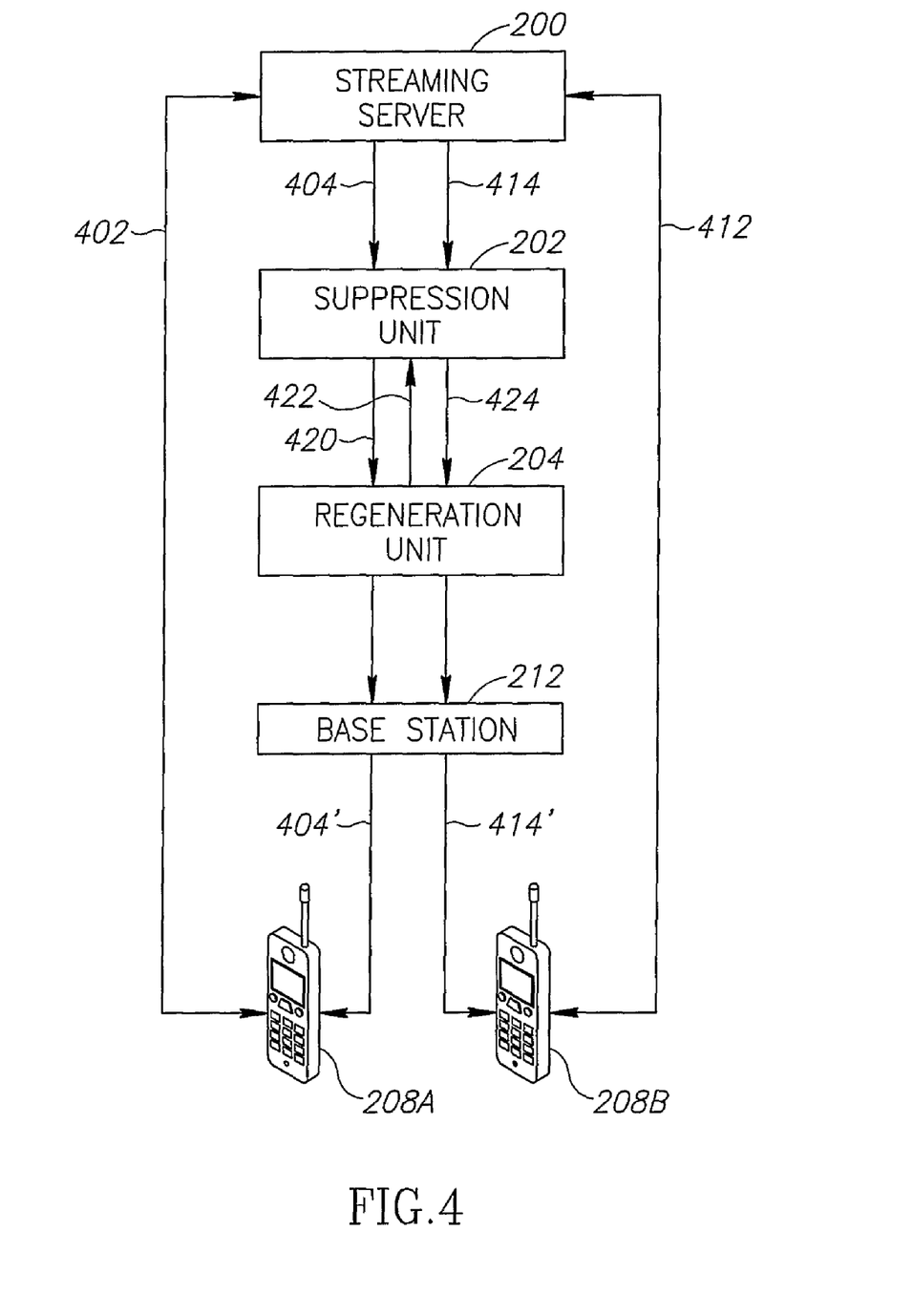
FIG. 4 is a signal chart of signal exchanges in performing a channel suppression, in accordance with an exemplary embodiment of the invention.

FIG. 4 is a signal chart of signal exchanges, in accordance with an exemplary embodiment of the invention. A first mobile station 208A requests a stream, in an RTSP negotiation procedure 402. The request optionally passes through units 202 and 204 and base station 212, although for simplicity, this is not shown in FIG. 4. Upon completion of the negotiation procedure 402, streaming server 200 provides a stream 404 for mobile station 208A. The stream 404 is forwarded by suppression unit 202 to regeneration unit 204, which forwards the stream without changes to base station 212 for delivery to mobile station 208A.

When a second mobile station 208B requests the same stream, in a negotiation procedure 412, streaming server 200 provides a second stream 414 having the same content as stream 404. Suppression unit 202 identifies the similarity of content and sends a suppression notification message 420 to regeneration unit 204, while continuing to forward both streams to regeneration unit 204. Responsive to suppression notification message 420, regeneration unit 204 prepares for regeneration of one of the streams 404 and 414 based on the other stream and sends an acknowledgement 422 back to suppression unit 202. Upon receiving the acknowledgement 422, suppression unit 202 prepares for the suppression and when a suitable suppression point, as discussed hereinbelow, is reached, suppression unit 202 stops transmitting both streams 404 and 414 and forwards only one stream 424 to regeneration unit 204. Regeneration unit 204 regenerates the second stream and forwards both streams to base station 212 to be forwarded to mobile stations 208A and 208B.

Point of Suppression and Suppression End

The suppression optionally begins immediately when suppression unit 202 identifies identical streams and/or once a suppression notification was sent and/or an acknowledgement from regeneration unit 204 was received. Alternatively, suppression unit 202 begins the suppression only at a boundary point within the suppressed stream, at which the switching is expected to occur more smoothly without data loss. The boundary point in video streams is optionally a point directly before a base frame (e.g., an I-frame) or even at the beginning of a group of pictures (GOP). Optionally, both the initiating and terminating of the suppression occur at a boundary point. Beginning the suppression with a base frame prevents trouble in reconstruction of the video frames by mobile stations 208, in case beginning the regeneration process results in missing a frame from before the suppression began.

Suppression unit 202 optionally also ends suppression of a stream directly before a base-frame, such that any problems in returning to the original stream will not result in loss of several frames.

In some embodiments of the invention, when a mobile station 208 whose stream serves as a master stream moves out of a cell, suppression unit 202 continues to transmit its frames until a base frame is reached. In some embodiments of the invention, suppression unit 202 identifies the stream of the moving mobile station in the new cell and forwards copies of its packets to the old cell. Alternatively, suppression unit 202 reconstructs the packets of the moving stream from the packets of the suppressed stream.

Optionally, when a mobile station moves from one cell to another, a cellular network unit drops all the frames of a video stream directed to the mobile station until a base frame of the stream is reached, under the assumption that at least one frame was lost during the movement of the mobile station between cells and therefore the mobile station will not be able to properly use non-base frames.

Enhancement of Master Stream

In some embodiments of the invention, suppression unit 202 enhances the master streams with additional data redundancy, using some of the bandwidth gained by the suppression of one or more streams. Optionally, in order to allow faster movement between suppression and non-suppression, for some of the non-base frames of the stream, suppression unit 202 adds a corresponding base frame that is transmitted in parallel to the non-base frame. In normal operation conditions, regeneration unit 204 merely discards the additional base frame. If, however, a suppression switching occurs, regeneration unit 204 may replace the non-base frame in the stream by the redundant base frame, if necessary to avoid or at least reduce data loss.

The addition of base frames is optionally performed more frequently than every 100 frames or even more frequently than every 50 frames. In some embodiments of the invention, the generation of an additional base frame (e.g., I-frame) is performed less frequently than every 200 milliseconds, or even less frequently than every 400 milliseconds. For example, the generation of a base frame (e.g., an I-frame) for a B or P frame may be performed every 0.5 seconds. The additional I-frames may be transmitted only for master streams or may be transmitted for all streams.

The addition of base frames may be provided at a fixed rate or may be provided at a rate adjusted according to the available bandwidth and/or processing resources. In some embodiments of the invention, the additional I-frames are generated within the cellular network, for example, by suppression unit 202.

Alternatively or additionally to providing the base frames in parallel to the corresponding non-base frames, regeneration unit 204 replaces some of the non-base frames (e.g., B-frames and/or P-frames) of the master stream with base frames (e.g., I-frames).

As is known in the art, in cases of packet loss, mobile stations may request transmission of an I-frame, so that they can resynchronize to the stream with the lost frames. In some embodiments of the invention, regeneration units 204 are adapted to intercept such requests and respond to them using the I-frames they received from suppression unit 202. The I-frames may be supplied independently from the rest of the stream or they may be embedded into the stream.

Alternatives

In some embodiments of the invention, for each group of streams carrying the same data, only a single stream is forwarded by suppression unit 202. Alternatively, two or three streams are forwarded, for redundancy, to allow for smooth delivery even in cases where one of the mobile stations moves to a different cell suddenly. Optionally, the number of forwarded streams depends on the total number of streams, and hence on the number of receivers. In some embodiments of the invention, when the number of streams carrying the same data is above a threshold, such as 5, two streams are forwarded, since the number of mobile stations affected by a disturbance in data delivery is relatively large.

It will be understand that maximal bandwidth saving is achieved when the suppression unit 202 is located as close as possible to network interface 201 and regeneration units 204 are located as close as possible to their respective base stations 212. It is noted, however, that the bandwidth advantages are not limited to such scenarios. For example, for simplicity of installation and/or maintenance, suppression unit 202 may be placed at a distance from network interface 201 and/or may be separated from network interface 201 by one or more routers, switches or other network elements (e.g., proxies). Similarly, regeneration units 204 may be separated from base stations 212. For example, in order to have a plurality of base stations 212 serviced by a single regeneration unit 204, the regeneration unit may be located before one or more routers or switches which direct the packets they receive to different base stations. This configuration is especially useful for groups of base stations located in proximity to each other, for example on the same tower.

In some embodiments of the invention, different regeneration units 204 are located at different proximities to their respective base stations 212, for example according to the capacities of the communication links leading to the base stations and/or the number of base stations 212 receiving service through a single link. For example, regeneration for base stations having a large capacity link leading to them in the last mile, may be performed before the last mile. Other base stations 212 may have smaller last mile links or may require larger amounts of bandwidth, for example because several base stations are serviced by a common last mile link, and consequently the regeneration is performed closer to the base stations.

Suppression unit 202 and regeneration units 204 are optionally stand-alone units implemented in hardware, software and/or combinations thereof. Alternatively, one or more of the suppression and regeneration units are incorporated within a switch, router, proxy or other element of the network. Further alternatively or additionally, suppression unit 202 is incorporated within network interface 201 and/or one or more of regeneration units 204 are incorporated within base stations 212.

Conclusion

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example only and are not intended to limit the scope of the invention in any way. It should be understood that features and/or steps described with respect to one embodiment may be used with other embodiments and that not all embodiments of the invention have all of the features and/or steps shown in a particular figure or described with respect to any specific embodiment. Having disclosed the novel approach herein, variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations within the claims. When used in the following claims, the terms "comprise", "include", "have" and their conjugates mean "including but not limited to".

The invention claimed is:

1. A method of reducing bandwidth utilization in a cellular network, comprising:
   receiving packet streams at a suppression unit of a cellular network;
   identifying a plurality of packet streams carrying the same data content, by the suppression unit;
   forwarding for packet streams identified as carrying the same data content, fewer packet streams than received, during a period in which the streams are identified to have the same content;
   regenerating the non-forwarded packet streams of the plurality of packet streams carrying the same data content, by a regeneration unit of the cellular network; and
   transmitting the plurality of packet streams including the regenerated streams to mobile stations,
   wherein the packet streams comprise video streams and wherein forwarding for packet streams identified to carry the same data content, fewer packet streams than received comprises stopping to forward packets of a stream whose packets were previously forwarded, responsive to the identification, and
   wherein stopping the forwarding of packets of the stream is performed directly before a base frame of the video stream.

2. A method according to claim 1, wherein identifying the plurality of packet streams carrying the same data content comprises identifying based on a channel indication within the packets of the streams.

3. A method according to claim 1, wherein identifying the plurality of packet streams carrying the same data content comprises identifying based on indications received from a unit external to the suppression unit.

4. A method according to claim 1, wherein forwarding for packet streams identified as carrying the same data content, fewer packet streams than received comprises forwarding only a single packet stream.

5. A method according to claim 1, wherein forwarding for packet streams identified to carry the same data content, fewer packet streams than received comprises forwarding at least two packet streams having a same content.

6. A method according to claim 1, wherein identifying the plurality of packet streams carrying the same data content comprises identifying based on a comparison of frame sizes of frames of the streams.

7. A method according to any of the previous claims, wherein identifying a plurality of packet streams carrying the same data content, by the suppression unit comprises comparing the received streams to time shifted versions of each other.

8. A method according to claim 7, wherein comparing the received streams to time shifted versions of each other comprises comparing with different extents of time shifting, up to a predetermined maximal time shift.

9. A method according to claim 8, wherein the predetermined maximal time shift is greater than 80 milliseconds.

10. A method according to claim 1, wherein identifying the plurality of packet streams carrying the same data content comprises identifying streams determined to have same attributes within a predetermined window.

11. A method according to claim 10, wherein the predetermined window has a size of at least 2.5 seconds.

* * * * *